United States Patent [19]

Wacker et al.

[11] Patent Number: 4,929,305

[45] Date of Patent: May 29, 1990

[54] METHOD OF BONDING USING UV CURABLE EPOXY RESIN COMPOSITIONS WITH DELAYED CURE

[75] Inventors: Thomas P. Wacker, Schenectady; Raymond J. Zabinski, Albany, both of N.Y.

[73] Assignee: General Electric Company, Waterford, N.Y.

[21] Appl. No.: 340,947

[22] Filed: Apr. 20, 1989

Related U.S. Application Data

[60] Division of Ser. No. 168,528, Mar. 7, 1988, Pat. No. 4,857,562, which is a continuation of Ser. No. 8,905, Jan. 30, 1987, abandoned.

[51] Int. Cl.$^5$ .............................................. B32B 31/00
[52] U.S. Cl. .................................. 156/273.3; 528/361
[58] Field of Search ............... 156/273.3; 522/31, 170; 525/524; 528/103

[56] References Cited

U.S. PATENT DOCUMENTS

| | | | |
|---|---|---|---|
| 4,256,828 | 3/1981 | Smith | 522/31 |
| 4,308,118 | 12/1981 | Dudgeon | 522/31 |
| 4,552,604 | 11/1985 | Green | 156/273.3 |
| 4,812,488 | 3/1989 | Koleske | 522/31 |

FOREIGN PATENT DOCUMENTS 154819  9/1985  European Pat. Off. ......... 156/273.3

Primary Examiner—Wilbert J. Briggs, Sr.
Assistant Examiner—David Buttner

[57] ABSTRACT

A fixing agent comprising poly(akylene oxide) moieties is used to fix a delayed cure of UV curable epoxy compositions exposed to UV radiation.

10 Claims, No Drawings

METHOD OF BONDING USING UV CURABLE EPOXY RESIN COMPOSITIONS WITH DELAYED CURE

This is a divisional application of U.S. Pat. No. 4,857,562, filed Mar. 7, 1988; which is a continuation of application Ser. No. 008.905, filed Jan. 30, 1987, now abandoned. The present invention relates to UV curable epoxy resin compositions having delayed cure upon UV radiation exposure. More particularly, the present invention relates to the addition of a fixing agent to UV curable epoxy resin compositions to fix a period of delayed cure and create open time in which the composition may be worked.

BACKGROUND OF THE INVENTION

UV curable epoxy resin compositions and their uses are well known in the art. Such compositions are used, for exmple, in printing inks, protective, decorative, and insulating coatings, pitting compounds, sealants, adhesives, molding compositions, wire insulation, textile coatings, laminates, impregnated tapes, varnishes, etc.

One problem with expanding the use of UV curable epoxy resins is that they may only be utilized where UV light can penetrate for curing. Further, upon exposure, cure begins immediately on the exposed surface and progresses into the resin with continued exposure. Thus, there is no opportunity to work the resin after exposure begins. Although, it is possible to cure many of these compositions by heating to temperatures of greater than about 150° C. This is simply impractical in most situations. As a consequence of the above, uses which require a composition to bond two opaque surfaces, to cure in a shaded area, or to be worked after UV exposure are not suitable for the application of UV curable epoxy compositions.

U.S. Pat. No. 4,308,118 discloses the combination of a UV activated and thermally activated catalyst to produce deep section cure epoxy resin compositions. These compositions may contain UV opaque fillers yet cure quickly upon the application of heat and UV radiation.

U.S. Pat. No. 3,960,979 discloses the use of polyether polyols, including polyethylene glycol and polypropylene glycol as flexibilizing agents in heat cured epoxy resins. These epoxy resins utilize an acid catalyst and a bake cycle at temperatures of from 80° C. to about 210° C.

U.S. Pat. No. 4,434,286 discloses the use of polyether polyols as a flexibilizing agent in cycloaliphatic epoxide resins having good electrical properties. These epoxy resin compositions utilize organic acids to catalyze the cure at temperatures of from about 100° C. to about 200° C.

It is an object of the present invention to produce a UV curable epoxy compositin that can be worked in an open time following exposure to UV radiation.

It is another object of the present invention to provide a UV curable epoxy composition with a fixed period of cure delay following exposure to UV radiation.

DESCRIPTION OF THE INVENTION

Briefly, according to the present invention, there is provided a curable epoxy composition, fixed for delayed cure, comprising:
 (a) an epoxy resin,
 (b) a sufficient amount of UV catalyst to render the composition UV curable, and
 (c) a sufficient amount of fixing agent comprising poly(alkylene oxide) moieties to prevent immediate skinning upon UV exposure.

The term "epoxy resin" as utilized in the description of the curable compositions of the present invention, includes any monomeric, dimeric, oligomeric or polymeric epoxy material containing one or a plurality of epoxy functinal groups. For example, those resins which result from the reaction of bisphenol-A (4,4'-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using UV catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Franger, J. Am. Chem. Soc. 81 632-5 (1959). As described in the literature, epoxy resins can also be modified in a number of standard ways such as reactins with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp 209–271.

The function of the fixing agent herein is to delay cure of the UV curable epoxy resin upon exposure to UV light. By adjusting fixing agent amount and composition, the cure may be fixed at some set time after UV exposure or may be entirely delayed until a very mild heating, for example 70° C. for 5 minutes.

The fixing agents herein are compounds which have poly(alkylene oxide) moieties. Preferred such compounds have the general formula:

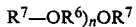

$$R^7-OR^6)_nOR^7$$

wherein $R^6$ is independently a divalent substituted or unsubstituted hydrocarbon radical, having from 2 to about 8 carbon atoms, $R^7$ is independently selected from the group consisting of hydrogen, substituted or unsubstituted hydrocarbon of 1 to 8 carbon atoms, and n is at least 2. Preferably $R^6$ has 1 to 5 carbon atoms, $R^7$ is hydrogen, methyl or epoxy hydrocarbon and n has a value of from 2 to 50. Particularly good properties are obtained in the UV curable epoxy resin composition where the fixing agent is epoxy functional. Thus, most preferably, $R^7$ is aliphatic or cycloaliphatic epoxy and n has a value of from 2 to 10.

Suitable UV catalysts for curing epoxy resins are well known to persons skilled in the art. The instant inventors are most familiar with the onium photoinitiators of the general formula:

$$[Y]^+{}_c[MQ_d]^{-(d-e)} \qquad 1$$

where Y is a cationic grop selected from the class consisting of:

$(R)_a(R^1)_bD$ (i), $(R)_f(R^2)_g(R^3)_hE$ (ii), and $(R)_f(R^4)_k(R^5)_mG$ (iii), M is selected from a metal or metalloid, Q is a halogen radical, R is a monovalent aromatic organic radical, $R^1$ is a divalent aromatic organic radical, $R^2$ and $R^4$ are monovalent organic aliphatic radicals selected from alkyl, cyclo alkyl and substituted alkyl, $R^3$ and $R^5$ are polyvalent organic radicals forming a heterocyclic or fused ring structure with E or G, D is a halogen radical, such as I, E is a group Va element selected from S, Se and Te, "a" is a whole number equal to 0 or 2, "b" is a whole number equal to 0 or 1 and the sum of "a"+"b" is equal to 2 or the valence of D, "f" is a whole number equal to 0 to 4 inclusive, "g" is a whole number equal to 0 to 2 inclusive, "h" is a whole number equal to 0 to 2 inclusive and the sum of "f"+"g"+"h" is a value equal to 4 or the valence of E, "j" is a whole number equal to 0 to 3 inclusive, "k" is a whole number equal to 0 to 2, inclusive and "m" is a whole number equal to 0 or 1, where the sum of "j"+"k"+"m" is a value equal to 3 or the valence of G, c=d−e, e is equal to the valence of M and is an integer equal to 2-7 inclusive and d is greater than e and is an integer having a value up to 8.

Radicals included by R can be the same or different, aromatic carbocyclic or heterocyclic radicals having from 6 to 20 carbon atoms, which can be substituted with from 1 to 4 monovalent radicals selected from $C_{(1-8)}$alkoxy, $C_{(1-8)}$ alkyl, nitro, chloro, etc., R is more particularly phenyl, chlorophenyl, nitrophenyl, methoxyphenyl, pyridyl, etc. Radicals included by $R^1$ are divalent radicals, such as

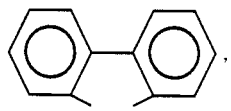

$R^2$ and $R^4$ radicals include $C_{(1-8)}$ alkyl, such as methyl, ethyl, etc., substituted alkyl, such as $-C_2H_4OCH_3$, $-CH_2COOC_2H_5$, $-CH_2COCH_3$, etc. $R^3$ and $R^5$ radicals include a structure such as

where Q' is selected from O, $CH_2$, NR', CO, $CH_2CH_2$ and S and R' is a monovalent radical selected from hydrogen and hydrocarbon.

Metal or metalloids included by M of formula 1 are transition metals such as Sb, Fe, Sn, Bi, Al, Ti, In, ti, Zr, Sc, V, Cr, Mn, Cs, rare earth elements such as the lanthanides, for example, Cd, Pr, Nd, etc., actinides, such as Th, Ta, U, Np, etc., and metalloids such as B, P, As, etc. complex anions included by $MD^{-(d-e)}{}_d$ are, for example, $BF^-{}_4$, $PF^-{}_6$, $AsF^-{}_6$, $FeCl^-{}_4$, $SnCl^-{}_6$, $SbCl^-{}_6$, $BiCl^-{}_5$, etc.

Halonium salts included by formula 1 above include 4,4'-dimethyldiphenyliodonium hexafluoroarsenate, 4,4-dichlorodiphenyliodonium hexafluoroarsenate, 4-methoxydiphenyliodonium hexafluoroborate, etc. Further halonium salts and methods to make are disclosed in U.S. Pat. No. 4,026,705 hereby incorporated by reference.

Group Va onium salts included by formula 1 are, for example, triphenylphenacyltetrafluoroborate, triphenylcarbethyoxymethyl phosphonium tetrafluoroborate, diphenylmethylphenylacyl arsonium bromide, N-phenylacylpyridinium bromide, etc. Further group Va onium salts and methods to make are disclosed by U.S. Pat. No. 4,069,055 hereby incorporated by reference.

Group VIa onium salts included by formula 1 are, for example, triphenylsulfonium hexafluorophosphate, 3,5-dimethyl-4-hydroxyphenyl dimethyl sulfonium fluoroborate, triphenylsulfonium hexafluoroarsenate, phenacyltetramethyl sulfonium fluoroborate, etc. Further Group VIa onium salts and methods to make are disclosed by U.S. Pat. No. 4,058,400 hereby incorporated by reference.

The fixed curable compositinos of the present invention can be made by simply blending the epoxy resin, which includes epoxy monomer, epoxy prepolymer, or mixture thereof with the fixing agent and UV cure catalyst. The resulting curable composition can be in the form of a varnish having a viscosity of from 10 centipoise at 25° C. up to the form of a free flowing powder.

Experience has shown that the proportion of UV cure catalyst to curable composition can vary widely in as much as the salt is substantially inert, unless activated. Effective results can be achieved if the proportion of from 0.1% to 15% by weight of UV cure catalyst is employed, based on the weight of curable composition.

The amount of fixing agent employed depends upon the desired delay sought, the particular epoxy resins employed; the ultraviolet light exposure, and the particular fixing agent. By manipulating the above variables properly, the delay in cure or skinning (surface cure to a tack free state) may be fixed anywhere from less than 1 minutes up to a day or two in the absence of mild heating. Persons skilled in the art may find certain fixing agents to be effective at from as little as about 1 part by weight up to 100 parts by weight fixing agent per 100 parts by weight total epoxy resin content. Of course, where the fixing agent is epoxy functional then it must be counted into the bulk of the epoxy resin in forming the stated ratios. Thus, the fixing agent may be both fixing agent (c) and epoxy resin (a). Preferably, from about 5 to about 50 parts by weight fixing agent are present for each 100 parts by weight epoxy resin. Most preferably, this ratio should be from about 10 to about 50 parts by weight fixing agent per 100 parts by weight epoxy resin.

The fixed curable compositions may be applied to a variety of substrates by conventional means and delay cured to a tack free state by either UV exposure alone or a combination of UV exposure and subsequent mild heating. At a minimum, the composition should receive enough exposure to UV radiation to activate the catalyst. Further exposure will spend and diminish the period of delayed cure, that is open time, by high yields of activated catalyst and by radiant heat energy from the UV radiation source. Of course, further exposure may be used as a variable to control open time, however, the composition must be removed from exposure before skinning or cure. After exposure and during the open time, the epoxy composition may be worked for instance, to act as an adhesive, to make contact with other substrates, etc.

The UV radiation should have a wavelength of from about 1849 A to 4000 A and an intensity of at least 5,000–80,000 microwatts/cm$^2$. Intensity should be linked with exposure time to insure sufficient exposure. Following UV exposure, the curable composition may require mild heating for final cure. Such heating should be carried out at as low a temperature as is effective given time constraints. Where heating is necessary, temperatures of from about 40° C. to about 150° C. are useful. This heating may be done in an oven, by exposing the composition to the radiated or conductive heat of a hot object, or by exposing the composition to an infrared radiation source.

EXAMPLES

In order that those skilled in the art will be better able to practice the invention, the following examples are given by way of illustration and not by way of limitation. All parts are by weight.

Ingredients

BPA epoxy—diglycidyl ether of bisphenol—A, Epon 828 resin, Shell Chemical Corporation.
Cyclo epoxy—3,4epoxycyclohexylmethyl-3,4-epoxycyclohexane carboxylate, ERL 4221 resin, Union Carbide Corporation.
Novolac epoxy—polyglycidyl ether of phenol-formaldehyde novolac, DEN 438 resin, Dow Chemical Company.
Fixing agent A—propylene glycol di(2,3-epoxypropyl)ether, epoxy equiv. wght.=305–335, Epon 502 resin, Shell Chemical Corporation, DER 732 resin, Dow Chemical Company.
Fixing agent B—propylene glycol di(2,3-epoxypropyl)ether, epoxy equiv. wght.=175–205, DER 736 resin, Dow Chemical Company.
Fixing agent C—poly(ethyleneglycol), Carboxwax 400 resin.
Catalyst A—50% solids in carrier triarylsulfonium hexafluoroantimonate, General electric Company.
Catalyst B—50% solids in carrier triarylsulfonium hexafluorophosphate, General Electric Company.
Catalyst C—50% solids in carrier di(dodecylphenyl) iodonium hexafluoroarsenate, General Electric Company.

Key to Tables s=non-tacky film formed on polymer surface
w=no visible curing; polymer is wet
g=polymer notably gelled
t=polymer cured but tacky
c=polymer solidly cured; non-tacky All examples are 10 mil films on cold rolled steel. Separate coated samples of each formulation were passed one and two times at a belt speed of 20 ft/min under 2–300 watt/in$^2$ medium pressure, mecury vapor, lamps with IR filter in place. Each sample, following UV exposure, was placed in an oven at 70° C. or at 150° C. if indicated.

Examples 1–6

These examples demonstrate the effect of increasing fixing agent content. The fixing agent is glycidyl functional.

| Expl. | Composition and Exposure | Amount | 0 | 1 | 2 | 3 | 4 | 5 | 10 | 15 | 5 | 30 |
|---|---|---|---|---|---|---|---|---|---|---|---|---|
| | | | Time after UV exposure, min | | | | | | | | Time of oven exp. | |
| 1 | BPA epoxy | 100 | | | | | | | | | | |
| | Fix A | 0 | | | | | | | | | | |
| | Cat B | 2 | | | | | | | | | | |
| | 1 pass | | s | | | | | | | | | c* |
| | 2 pass | | s | | | | | | | | | c* |
| 2 | BPA epoxy | 95 | | | | | | | | | | |
| | Fix A | 5 | | | | | | | | | | |
| | Cat B | 2 | | | | | | | | | | |
| | 1 pass | | w | | | | | t | | t | c | |
| | 2 pass | | s | | | | | | | s | c | |
| 3 | BPA epoxy | 75 | | | | | | | | | | |
| | Fix A | 25 | | | | | | | | | | |
| | Cat B | 2 | | | | | | | | | | |
| | 1 pass | | w | w | | | | w | t | t | c | |
| | 2 pass | | w | g | | | | t | t | t | c | |
| 4 | BPA epoxy | 20 | | | | | | | | | | |
| | Fix A | 80 | | | | | | | | | | |
| | Cat B | 2 | | | | | | | | | | |
| | 1 pass | | w | | | | | | | w | c | |
| | 2 pass | | w | | | | | | | w | c | |
| 5 | BPA epoxy | 5 | | | | | | | | | | |
| | Fix A | 95 | | | | | | | | | | |
| | Cat B | 2 | | | | | | | | | | |
| | 1 pass | | w | | | | | | | w | c | |
| | 2 pass | | w | | | | | | | w | c | |
| 6 | BPA epoxy | 0 | | | | | | | | | | |
| | Fix A | 100 | | | | | | | | | | |
| | Cat B | 2 | | | | | | | | | | |
| | 1 pass | | w | | | | | | | w | c | |

-continued

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| | 2 pass | | w | | | | | | | w | c | |

*150° C. oven

EXAMPLES 7-8

These examples demonstrate glycidyl functinal fixing agent response to oven exposure without UV exposure.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 7 | BPA epoxy | 0 | | | | | | | | | | |
| | Fix A | 100 | | | | | | | | | | |
| | Cat B | 2 | | | | | | | | | | |
| | 1 pass | | ---no UV exposure--- | | | | | | | | w | |
| | 2 pass | | | | | | | | | | | |
| 8 | BPA epoxy | 0 | | | | | | | | | | |
| | Fix A | 100 | | | | | | | | | | |
| | Cat B | 2 | | | | | | | | | | |
| | 1 pass | | ---no UV exposure--- | | | | | | | | w* | |
| | 2 pass | | | | | | | | | | | |

*150° C. oven

EXAMPLES 9-10

These examples demonstrate the response of cycloaliphatic epoxy resins to fixing agent addition.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 9 | Cyclo epoxy | 100 | | | | | | | | | | |
| | Fix A | 0 | | | | | | | | | | |
| | Cat B | 2 | | | | | | | | | | |
| | 1 pass | | s | | | | | | | | c | |
| | 2 pass | | s | | | | | | | | c | |
| 10 | Cyclo epoxy | 50 | | | | | | | | | | |
| | Fix A | 50 | | | | | | | | | | |
| | Cat B | 2 | | | | | | | | | | |
| | 1 pass | | w | t | | | | | | | c | |
| | 2 pass | | c | | | | | | | | c | |

EXAMPLES 11-12

These examples demonstrate novolac epoxy response to fixing agent addition.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 11 | Novolac epoxy | 100 | | | | | | | | | | |
| | Fix A | 0 | | | | | | | | | | |
| | Cat B | 2 | | | | | | | | | | |
| | 1 pass | | s | | | | | | | | c | |
| | 2 pass | | s | | | | | | | | c | |
| 12 | Novolac epoxy | 75 | | | | | | | | | | |
| | Fix A | 25 | | | | | | | | | | |
| | Cat B | 2 | | | | | | | | | | |
| | 1 pass | | w | | t | | | | | | t | c |
| | 2 pass | | t | c | | | | | | | c | |

EXAMPLES 13-14

These examples demonstrate the use of low molecular weight fixing agent addition.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 13 | BPA epoxy | 100 | | | | | | | | | | |
| | Fix B | 0 | | | | | | | | | | |
| | Cat B | 2 | | | | | | | | | | |
| | 1 pass | | s | | | | | | | | c | |

-continued

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 14 | 2 pass<br>BPA epoxy<br>Fix B<br>Cat B | <br>75<br>25<br>2 | s | | | | | | | | c | |
| | 1 pass | | w | | | | | | | w | c | |
| | 2 pass | | w | | | | | t | | t | c | |

EXAMPLES 15–16

These examples demonstrate the use of a halonium salt catalyst in combination with a fixing agent.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 15 | BPA epoxy<br>Fix A<br>Cat C | 100<br>0<br>2 | | | | | | | | | | |
| | 1 pass | | s | | | | | | | | c | |
| | 2 pass | | s | | | | | | | | c | |
| 16 | BPA epoxy<br>Fix A<br>Cat C | 75<br>25<br>2 | | | | | | | | | | |
| | 1 pass | | w | | | | | | | w | c | |
| | 2 pass | | w | | | | | | | w | c | |

EXAMPLES 17–18

These examples compare the use of low molecular weight and high molecular weight fixing agent.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 17 | BPA epoxy<br>Fix A<br>Cat B | 75<br>25<br>2 | | | | | | | | | | |
| | 1 pass | | w | | | | | | | t | c | |
| | 2 pass | | w | | | | | t | | t | c | |
| 18 | BPA epoxy<br>Fix B<br>Cat B | 75<br>25<br>2 | | | | | | | | | | |
| | 1 pass | | w | | | | | | | w | c | |
| | 2 pass | | w | | | | | t | | t | c | |

EXAMPLE 19

This example demonstrates the use of a fixing agent having no epoxy functionality.

| Expl. | Composition and Exposure | Amount | Time after UV exposure, min | | | | | | | | Time of oven exp. | |
|---|---|---|---|---|---|---|---|---|---|---|---|---|
| | | | 0 | 1 | 2 | 3 | 4 | 5 | 10 | 15 | 5 | 30 |
| 19 | BPA epoxy<br>Fix C<br>Cat B | 75<br>25<br>2 | | | | | | | | | | |
| | 1 pass | | w | | | | | | | w | c | |
| | 2 pass | | w | | | | | | | t | c | |

What is claimed is:

1. A method for employing an epoxy resin composition comprising the steps:
   (a) exposing a composition to sufficient UV radiation to activate a UV catalyst, said composition comprising:
      (i) an epoxy resin,
      (ii) a sufficient amount of the UV catalyst to render the composition UV curable, and
      (iii) a sufficient amount of an epoxy functional fixing agent comprising poly(alkylene oxide) moieties, the fixing agent capable of delaying the cure of the composition for a fixed period of time after exposure to UV radiation; and
   (b) positioning the epoxy composition between two opaque surfaces for bonding; and
   (c) curing the epoxy composition by heating to a temperature between about 40° C. and 150° C.

2. The method as defined in claim 1, wherein the UV catalyst is an onium photo initiator.

3. The method as defined in claim 2, wherein the fixing agent is present in an amount of from about 1 to about 100 parts by weight per 100 by weight total epoxy resin content.

4. The method as defined in claim 1, wherein the fixing agent is present in an amount of from about 5 to 50 parts by weight per 100 parts by weight total epoxy resin content.

5. The method as defined in claim 1, wherein the fixing agent has the general formula:

$$R^7-(-OR^6-)_n-OR^7$$

wherein $R^6$ is independently a divalent substituted or unsubstituted hydrocarbon radical having from 2 to about 8 carbon atoms, $R^7$ is an epoxy hydrocarbon, and n is at least 2.

6. The method as defined in claim 5, wherein $R^6$ has 1 to 5 carbon atoms, $R^7$ is an epoxy hydrocarbon, and n as a value of from 2 to 50.

7. The method as defined in claim 5, wherein $R^7$ is selected from the group consisting of aliphatic and cycloaliphatic epoxy.

8. The method as defined in claim 5, wherein the fixing agent is a diglycidyl ether of poly(alkylene oxide).

9. The method as defined in claim 5, wherein the epoxy resin comprises resin selected from the group consisting of bisphenol-A epoxy resin, epoxy novolac resin, and cycloalophatic epoxy resin.

10. The method as defined in claim 5, wherein $R^6$ is selected from the group consisting of $-CH_2CH_2-$ and $Ch_2CH(CH_3)-$, $R^7$ is epoxy hydrocarbon, and n is at least 2.

* * * * *